US005404452A

United States Patent [19]

Detschel et al.

[11] Patent Number: 5,404,452
[45] Date of Patent: Apr. 4, 1995

[54] PERSONAL COMPUTER BUS AND VIDEO ADAPTER FOR HIGH PERFORMANCE PARALLEL INTERFACE

[75] Inventors: William F. Detschel, Saugerties; Darwin W. Norton, Jr., Stone Ridge; Richard C. Paddock, Red Hook, all of N.Y.

[73] Assignee: International Business Machines Corporation, Armonk, N.Y.

[21] Appl. No.: 264,215

[22] Filed: Jun. 22, 1994

Related U.S. Application Data

[63] Continuation of Ser. No. 558,003, Jul. 25, 1990.

[51] Int. Cl.$^6$ .................. G06F 13/00; G06F 13/32
[52] U.S. Cl. ........................ 395/250; 395/200; 364/DIG. 1; 364/238.6; 364/239.51; 364/239.6
[58] Field of Search .............. 395/164, 166, 200, 250, 395/275

[56] References Cited

U.S. PATENT DOCUMENTS

| 4,298,954 | 11/1981 | Bigelow et al. | 395/250 |
|---|---|---|---|
| 4,672,570 | 6/1987 | Benken | 364/900 |
| 4,727,538 | 2/1988 | Furchtgott et al. | 370/85 |
| 4,763,317 | 8/1988 | Lehman et al. | 370/58 |
| 4,843,466 | 6/1989 | Music et al. | 358/133 |
| 4,857,991 | 8/1989 | Music et al. | 358/13 |
| 4,862,154 | 8/1989 | Gonzalez-Lopez | 340/747 |
| 4,945,495 | 7/1990 | Ueda | 395/130 |
| 5,117,486 | 5/1992 | Clark et al. | 395/250 |
| 5,121,480 | 6/1992 | Bonke et al. | 395/250 |
| 5,163,132 | 11/1992 | DuLac et al. | 395/275 |

FOREIGN PATENT DOCUMENTS 2389285 11/1978 France .

OTHER PUBLICATIONS

"Data Flow Control at the Physical Layer Boundary", *IBM Technical Disclosure Bulletin*, vol. 30, No. 5, Oct. 1987, pp. 221-223.
"Swinging Buffer With Programmable Size", *IBM Technical Disclosure Bulletin*, vol. 30, No. 4, Sep. 1987, pp. 1432-1434.
Alexander, J., "A VME Interface to an IBM Mainframe Computer", Cern VMEBUS in Physics Conference Proceedings, Jan. 30, 1986, Geneva, Switzerland, pp. 291-296.
Tolmie, D., "The High-Speed Channel (HSC) Standard", *Compcon Spring '89* digest of papers, 1989 IEEE, pp. 314-317.
Andrews, W., "ASIC Memories: Bigger, Faster & Customized", *Computer Design*, Oct. 1988 pp. 44-62.
Pai, T., "FIFO RAM Controller Tackles Deep Pasa Buffering", *Computer Design*, Aug. 1986, pp. 109-112.

*Primary Examiner*—Thomas G. Black
*Assistant Examiner*—John C. Loomis
*Attorney, Agent, or Firm*—Floyd A. Gonzalez; James E. Murray

[57] ABSTRACT

Adapters attach the bus or video display of a personal computer or workstation to a high performance parallel interface (HIPPI) channel of a host computer. The HIPPI channel operates at a burst rate of 100 megabytes (MB) per second. The adapter includes an electrical circuit interface to provide compatible signal levels between the HIPPI channel and the bus of the personal computer or workstation. The adapter attaching the bus includes a first-in, first-out (FIFO) buffer that receives data words from the HIPPI channel. Control logic monitors the status of the FIFO buffer and interlocks the operation of the personal computer or workstation bus with the HIPPI channel so that proper data transfer is performed by the FIFO buffer. The adapter attaching the video display includes a pair of buffers operating in a ping-pong fashion to allow data to be written while data is being read. The buffers can be addressed by the personal computer or workstation as if they were internal memory. To allow a plurality of workstations to be connected to a single HIPPI channel, the HIPPI adapter is modified to include a pass through function allowing the devices to be connected in a "Daisy chain".

15 Claims, 9 Drawing Sheets

PERSONAL COMPUTER BUS AND VIDEO ADAPTER FOR HIGH PERFORMANCE PARALLEL INTERFACE

CROSS REFERENCE TO RELATION APPLICATION

This application is a continuation of application Ser. No. 07/558,003, filed Jul. 25, 1990, now abandoned.

BACKGROUND OF THE INVENTION

1. Field of the Invention

The present invention generally relates to interfacing high speed computer systems to other such systems and to personal computers used as terminals or workstations in a high speed computer system. The preferred embodiment of the invention is described in the environment of a standard High Performance Parallel Interface (HIPPI) as implemented on an IBM 3090 mainframe computer, an IBM PERSONAL SYSTEM/2 (PS/2) computer and an RISC SYSTEM/6000 computer, the latter two computers having the 32-bit MICRO CHANNEL bus; however, it will be understood that the invention can be adapted to other mainframe computers and other personal computers using different bus architectures. (PERSONAL SYSTEM/2, PS/2, RISC SYSTEM/6000, and MICRO CHANNEL are registered trademarks of IBM Corp.)

2. Description of the Prior Art

High performance personal computers based on the Intel i386 and i486 microprocessors, such as IBM's PERSONAL SYSTEM/2 (PS/2) computers, and reduced instruction set computer (RISC) microprocessors, such as IBM's RISC SYSTEM/6000 workstations, are making possible workstations with enhanced graphics capabilities. (i1386 and i486 are registered trademarks of Intel Corp.) The large memories addressable by these microprocessors using an operating system such as IBM's OPERATING SYSTEM/2 (OS/2) or AIX, IBM's licensed version of UNIX, allow for the rapid processing of the enormous quantity of data required to support, for example, three dimensional graphics. (OPERATING SYSTEM/2, OS/2 and AIX are registered trademarks of IBM Corp., and UNIX is a registered trademark of AT&T Corp.) While these computers are competent stand alone systems, the greatest potential for improved performance is to interconnect them with a high performance host system, such as IBM's 3090 system.

Figure 1:
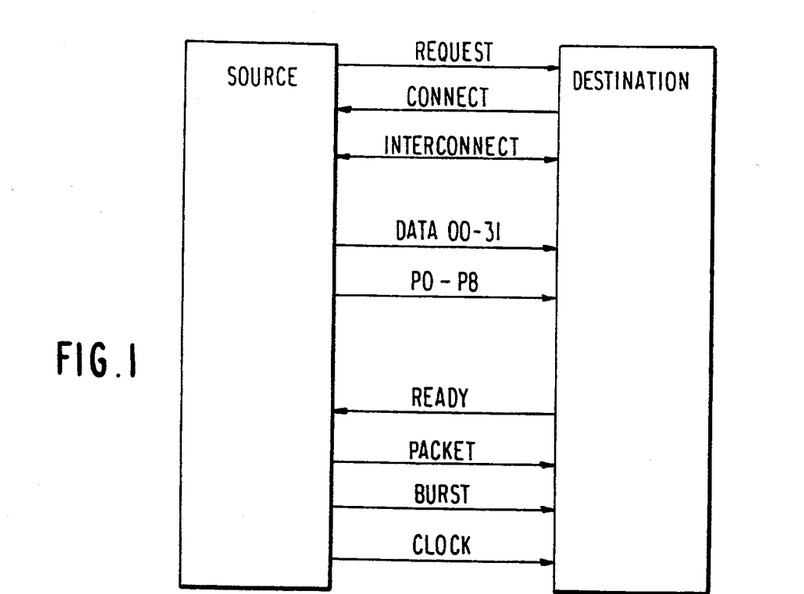
FIG. 1 is a block diagram illustrating the connection details for a HIPPI channel.

A high speed channel is a proposed standard that has been developed by the X3T9.3 Task Group of the American National Standards Institute (ANSI). The ANSI draft standard is X3T9/88-127, Rev. 6.7. This standard uses a four byte parallel bus to transmit information at a speed of 100 megabytes (MB) per second. IBM announced its version of a High Performance Parallel Interface for the 3090 system as a Super computer System Extension in May 1989. Transmission over the channel is controlled by several control signals. These signals permit the sender and the receiver to synchronize transfers properly. FIG. 1 shows the layout of the signals in a HIPPI connection. A full implementation of the channel uses two identical subchannels, one of inbound data and the other for outbound. The definition of the channel permits the two subchannels to operate simultaneously. For the purposes of the present invention, the channel operation can be summarized by describing the functions of signals that are used by the channel as shown in FIG. 1.

1. The request line is used by the source device (e.g., the 3090) to signal the destination (i.e., a workstation) that a channel transfer is desired. The destination responds by asserting the connect signal.
2. Connect is asserted by the destination device in response to a request signal from the source. Connect remains active until either the request signal deactivates or the destination decides to break the connection. Connection is usually ended by the source dropping Request so deactivation of Connect for any other reason is usually due to a malfunction. Request and connect remain true during channel operations.
3. The interconnect wires form a current loop from source to destination. By sensing the current flow in this loop, it can be determined that cables are connected between source and destination.
4. Information is transferred on the data and parity wires of the interface. There are four bytes (32 bits) with a single parity bit for each byte for a total of 36 bits.
5. The Ready signal is asserted by the destination to signal that it is ready to receive a burst of data. The sending of Ready signals is not interlocked to the transmission of bursts. The destination can send Ready "ahead of time" to avoid signaling delay. The source will count the number of Ready signals sent and continue transmission until the count is exhausted.
6. The Packet signal is used by the source to identify a group of one or more bursts as a unit or packet. Packet is asserted by the source after the Request-/Connect sequence and thus precedes the first burst. Packet is deactivated by the source after a fixed number of bursts have been transmitted. If count of Ready signals sent is not zero, the source will continue with the next packet immediately; otherwise, it will wait for a Ready signal.
7. A burst of data on the channel contains 256 transfers, each of which contains one fullword (four bytes) of data. The data is transferred on the four byte data bus of the channel. The source sends a burst of data in response to the Ready signal sent by the destination. The source will send one burst for each ready signal sent by the destination. Note that the destination does not have to receive a burst before sending another Ready signal; it may signal Ready "ahead of time" when it has room to buffer the burst. If the Ready signal for a burst arrives at the source prior to the completion of the present burst, then the net burst will be transmitted without any delay. This feature permits the 100 MB rate to be sustained with large buffers. The burst line shown in FIG. 1 is made active when the first data word (HIPPI data word—4 bytes) is placed on the bus and remains active for the duration of the transfers.
8. The Clock signal is generated by the source and is times such that it can be used by the destination to properly receive and latch up the data and control signals. This signal has a fixed period of 40 nanoseconds (ns). The clock signal runs continuously.

Figure 2:
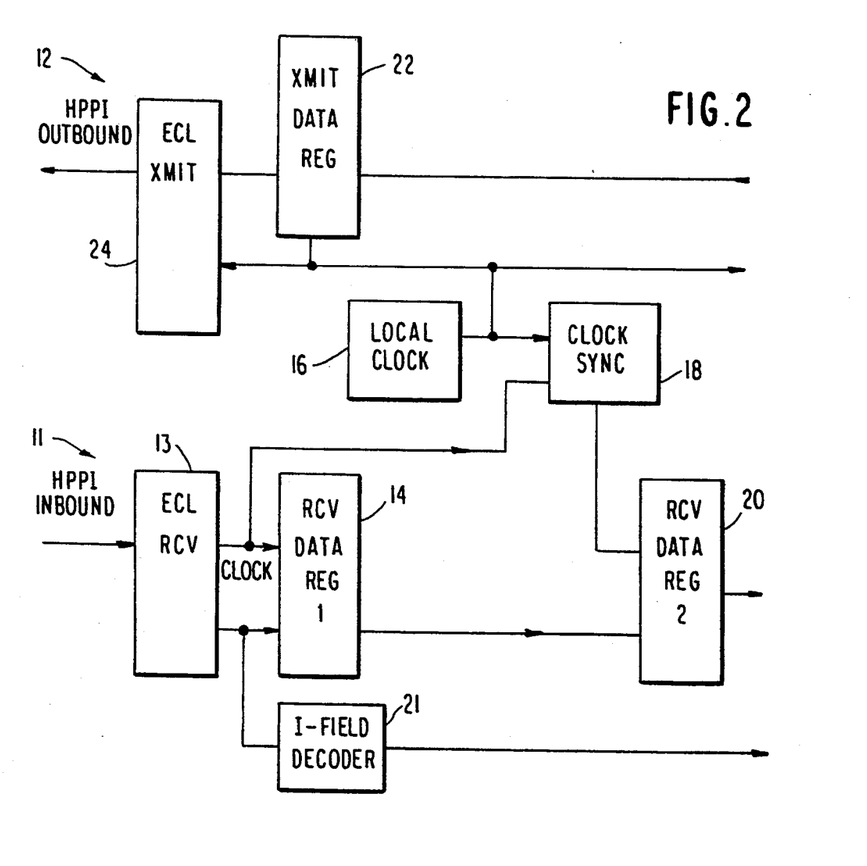
FIG. 2 is a block diagram showing the basic HIPPI adapter.

The HIPPI adapter as implemented by IBM is illustrated in FIG. 2. It consists of inbound and outbound sections 11 and 12, respectively, with essentially no interconnections between the two sides. The inbound side receives data from the HIPPI channel via receiver circuits 13 which convert the differential signals on the cable to single ended signals for the adapter logic. The received data is first captured in a latch 14 that is clocked using the inbound clock signal. Since the source controls the skew between the data and the clock signal, this technique ensures reliable capture of the data. Once the data is captured, it must then by synchronized with the local clock 16 in the adapter. The clock synchronizer circuitry 18 uses clock signals from the inbound HIPPI channel and the local clock 16 to perform this operation. The data is then transferred to a second latch 20 where it can be used by the logic of the adapter. The inbound side may also include optional logic 21 to decode routing information that is transmitted on the HIPPI channel during the connect sequence. This information, called the I-field, is placed on the data bus when the Request signal is asserted by the source. The I-field is simply a 32-bit number which can be used as desired to establish routing via switch devices. In the basic adapter implementation, this information is not needed but may be used like an address if desired. The ANSI standard does not define the format or interpretation of the I-field. On the outbound side of the adapter, the local clock 16 is used to transmit the data onto the HIPPI channel from a holding register 22. This register feeds differential driver circuits in the transmitter 24 which produce the proper signals for the interface. The local clock is sent out on the interface as the HIPPI clock since the adapter is the source for the outbound signals and must provide the clocking.

Figure 3:
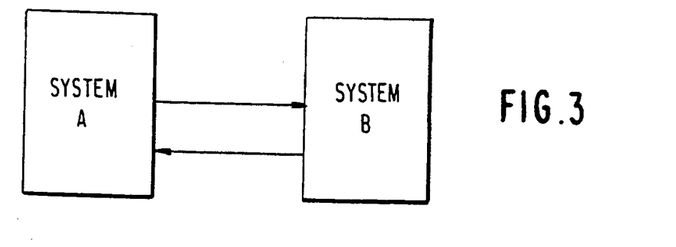
FIG. 3 is a block diagram illustrating a basic HIPPI interconnection.
Figure 4:
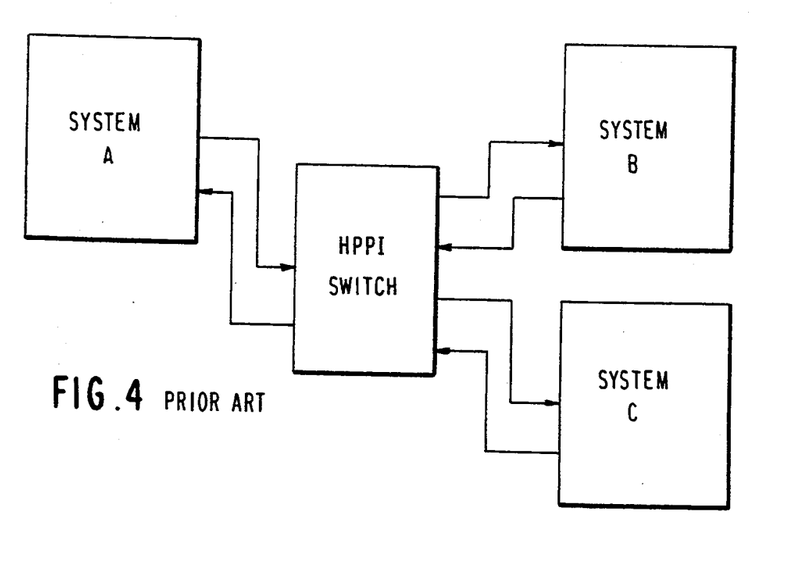
FIG. 4 is a block diagram showing a prior art attachment of multiple devices.

The HIPPI channel uses differential ECL (emitter coupled logic) drivers to achieve high performance. Because of this, it is not feasible to multidrop the channel if it is desired to attach more than one workstation to a channel. This restricts the HIPPI channel to a "two party" operation as shown in FIG. 3. If attachment to more devices is required, then a channel switch device must be inserted as shown in FIG. 4. The channel switch must have three sets of send and receive circuits as shown in FIG. 4. Another set of send and receive circuits must be added for each new device to be attached. In addition to the interface logic, the switch must implement internal switching functions which require that all of the HIPPI signals be available at each output. Since there are over forty signals in the interface, the complexity of the switch grows rapidly.

IBM's MICRO CHANNEL Architecture (MCA) bus was the first bus for personal computers providing 32-bit address and 32-bit data capabilities, replacing the former 24-bit addressing and 16-bit data standard. The MCA bus is available on certain models of IBM PS/2 and RISC System/6000 computers and on other licensed computers. Other 32-bit bus architectures are now on the market. At present, the maximum transfer rate to personal computers with a 32-bit bus architecture is limited to the speed of the host adapter devices which are currently available. The rate obtained depends on many factors, but it is usually less than one MB (megabyte) per second. In any case, the speed is limited to the speed of the block multiplexer channel on the host, which in the case of an IBM 3090 system is about 3 MB per second.

Summary of the Invention

It is therefore an object of the present invention to provide a high speed attachment to a host computer having a high performance parallel interface for a personal computer or workstation connected to the host computer.

It is another object of the invention to provide a means of synchronizing the high speed transfer of data objects (images, files, etc.) between a host computer and a personal computer and a workstation.

It is a further object of the invention to accomplish the interconnection of a host computer with a high speed parallel interface to a personal computer or workstation which is inexpensive and yet provides high data rate transfers.

It is yet another object of this invention to provide a video adapter which permits the attachment of a video display device to any system which implements the ANSI HIPPI parallel channel.

It is still a further object of the present invention to provide a way for adding devices to a HIPPI channel without the need for a switch device and in such a way that complexity and cost are minimized.

According to one aspect of the present invention, an adapter is provided for connection to the high speed channel on the IBM 3090 system which allows data transfer rates to be increased to the maximum rate of the MICRO CHANNEL bus on the PS/2 or RISC System/6000 and other licensed computers. This represents an improvement in the range of three to twelve times the present maximum and ten to forty times that usually obtained. In fact, burst rates of 100 MB per second are possible with the invention, although the improvements mentioned above are averages that can be sustained.

According to another aspect of the invention, a video adapter is provided for connection to a HIPPI channel. The adapter includes two identical buffer memory arrays managed as "ping-pong" buffers. Each buffer memory array is composed of two port RAM (random access memory) modules having a random access (RAM) port and a serial access (SAM) port. The SAM port consists of a shift register that is loaded in parallel from the main array and then shifted out to a video generator. A MICRO CHANNEL interface permits the workstation to access the buffer memory arrays. This adapter is especially useful when the display is used to show animated sequences.

According to yet another aspect of the invention, the HIPPI adapter is enhanced to permit a "Daisy chain" connection of multiple systems. The protocol requires the transmission of an additional field, called the I-Field, which is used to identify the destination system. The adapter therefore includes an I-Field decoder which communicates with pass through logic that determines whether data is to be received or passed through to the next system in the "Daisy chain".

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENTS OF THE INVENTION

Figure 5:
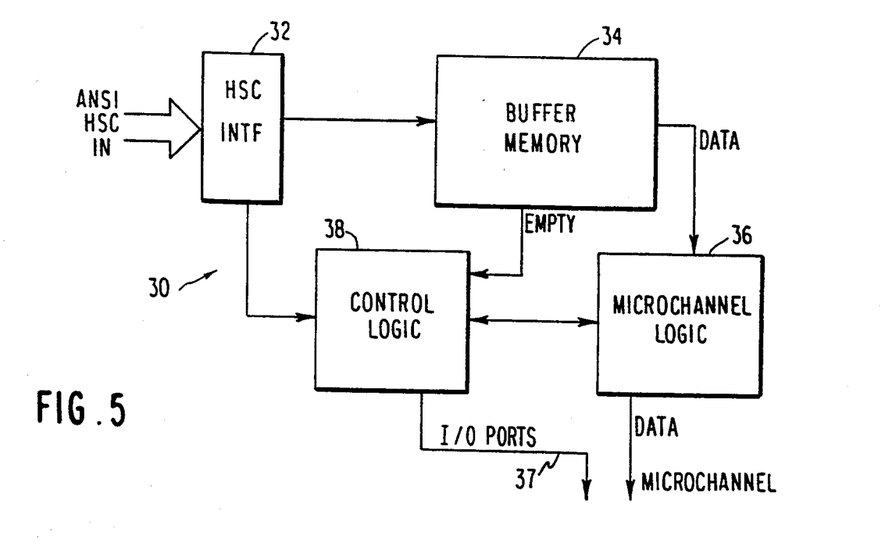
FIG. 5 is a block diagram showing the components of the host to adapter interface according to one aspect of the invention.

Referring now to the drawings, and more particularly to FIG. 5, an adapter 30 includes a HIPPI channel electrical interface 32. This component receives the signals from the high speed channel and converts them from differential ECL (emitter coupled logic) signals to the TTL (transistor-transistor logic) signals needed by the rest of the adapter. In addition to signal conversion, the logic of the electrical interface 32 also checks the parity of the incoming data. The output of the electrical interface 32 is provided to a first-in, first-out (FIFO) buffer 34. The buffer 34 comprises a FIFO storage array and the logic necessary to control its operation. In a specific implementation of the invention, the FIFO array contains 8 K bytes of data. This corresponds to eight data bursts on the ANSI standard HIPPI channel. When the buffer 34 is empty an "empty" signal is provided to the microchannel logic 36 via the control logic 38. The output of the FIFO buffer 34 is provided to MICRO CHANNEL logic 36 which maps the FIFO buffer into an area of system memory that can be accessed by the personal computer or workstation. The exact address of the area is variable so that the memory map can be customized for different configurations. In addition to the memory map, the MICRO CHANNEL logic 36 also presents status information to the personal computer or workstation in response to input/output (I/O) read commands from the MICRO CHANNEL bus. This function permits personal computer or workstation software to determine the status of the channel link and the FIFO buffer. A particularly important function of this component is that it permits work station software to monitor the state of the "Packet" signal on the channel. Each of the electrical interface 32, the FIFO buffer 34 and the MICRO CHANNEL logic 36 are controlled by control logic 38. The circuitry in this block interlocks the operation of the MICRO CHANNEL and the high speed channel so that proper data transfer can be performed via the FIFO buffer 34.

Data transfer begins by the initialization of the HIPPI interface by 3090 software. One key parameter that is set at this time is the size of the packet. The packet size is set to correspond to the size of the data object being sent. In the case of a specific implementation, the objects being sent were images containing 64 K bytes (64 bursts). By adjusting the size of a packet, other objects such as file blocks, text blocks, and so forth can be accommodated. The importance of this technique will become apparent later. As soon as the channel is initialized, the 3090 asserts the Request signal on the HIPPI interface. The adapter then responds with the Connect signal to indicate the data transfer may begin. After the receipt of the Connect signal, the 3090 asserts the Packet signal and waits for a Ready signal from the adapter. Data transfer begins as soon as the adapter sends a Ready signal. In response to the Ready signal, the 3090 transfers one burst of 256 words. The adapter logic 38 is designed to send Ready signals in advance as long as the FIFO buffer 34 indicates that it is less than three quarters full. Ready signals will be withheld from the 3090 as soon as the FIFO buffer 34 becomes three quarters full and will only resume when the MICRO CHANNEL side of the adapter has emptied the FIFO to the halfway point. This technique makes it impossible for the HIPPI channel to overrun the MICRO CHANNEL bus.

The MICRO CHANNEL side of the adapter presents an interrupt via leads 37 to the attached personal computer or workstation as soon as the FIFO "empty" signal becomes inactive. Personal computer or workstation software then reads data from the adapter by accessing storage addresses within the area mapped by the adapter. Since data is transferred in bursts of 256 words, the personal computer or workstation software need not check the status of the FIFO buffer 34 until after it has removed one burst from the FIFO memory area. After the first burst has been taken from the FIFO memory area, the status of the "empty" signal must be checked periodically to insure that the FIFO buffer as not been emptied. Even though the 3090 is ten times faster than the MICRO CHANNEL bus, it can be interrupted during a channel transfer and thus suspend transmission on the HIPPI channel for a short time. If this time is sufficient for the FIFO buffer 34 to be emptied by the personal computer or workstation, an underrun will occur. By monitoring the status of the "empty" signal, the workstation software can prevent such an underrun.

Operation continues in this manner until the entire data object has been transferred via the HIPPI channel. The ANSI definition implemented by the HIPPI channel does not include a specific "end of transfer" signal (such as "Device End"). This makes it difficult to determine when a data transfer should conclude. To overcome this difficulty, the MICRO CHANNEL adapter permits the personal computer or workstation to monitor the state of the HIPPI Packet signal. The size of a packet is set by the 3090 system to be equal to the size of the data object being transmitted. By reading the state of the Packet signal, the workstation software can determine whether or not the transmission has completed. Any data remaining in the FIFO buffer 34 can then be read out until the "empty" signal is activated by the FIFO buffer. It is necessary to monitor the state of both the Packet signal and the FIFO "empty" signal in order to assure the integrity of the transmission.

The control logic 38 may be implemented in microcode as a hardware state machine. The following description is of the microcode which, in the preferred embodiment, is assembler code running in the personal computer or workstation. The microcode has various entry points. They are an initialize entry point, an interrupt entry point, and three entry points which are called to move data to one of three destinations. The destinations are an image buffer, a memory buffer or a display memory. In a preferred embodiment, the image buffer is a video graphics array (VGA) buffer, the memory buffer is a 64 K buffer for text data, and the display memory supports the IBM 8514 display memory. The interrupt entry point has the function of setting an indicator (HIPPI_Data_Available) which indicates to an application program that data has arrived from the host (and is in the FIFO buffer) thus signaling the start of a data transfer. The initialize entry point sets the interface card registers to a predefined state, enables the interface to the adapter, and so forth.

The microcode makes use of the following lines, which are brought to the MICRO CHANNEL interface as I/O ports.

1. Packet. This line follows the state of packet on the HIPPI channel. It is used to indicate that a data transfer of one or more packets, constituting a data object, is in progress.
2. Data Available. This line indicates that data is available in the FIFO buffer. It is set active by the hardware state machine when data is in the buffer, and it is set inactive by the state machine when the buffer is empty.
3. Enable HIPPI. Writing to this location primes the interface to receive data from the host over the HIPPI channel. This line, when active, allows the hardware state machine to send Ready signals to indicate that the host may send data. It is disabled by the state machine when Packet drops. It is enabled by the microcode when the personal computer or workstation is ready to receive data.

Figure 6:
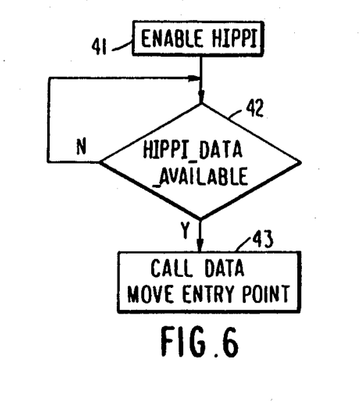
FIGS. 6 and 7 are flow charts showing the microcode for the handshaking at the beginning of a data transfer.
Figure 7:
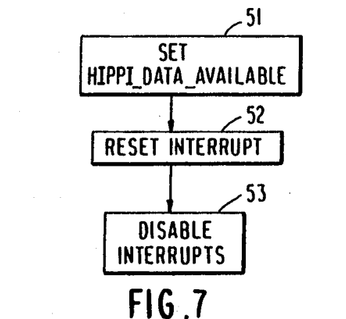

With reference now to FIG. 6, the hardware state machine has been enabled in function block 41 to allow reception of data from the host. The host sends data, and it is received by the FIFO buffer. The hardware state machine, as a result of the data being in the FIFO buffer, causes an interrupt. In FIG. 7, the interrupt handler is called and sets HIPPI_Data_Available in function block 51, resets the interrupt in function block 52, and disables any further interrupts in function block 53 for the duration of the transfer (determined by the length of the packet). Returning to FIG. 6, the setting of HIPPI_Data_Available is detected in decision block 42, and in response to this, a call is made in function block 42 to one of the data move entry points, shown in more detail in FIG. 8.

Figure 8:
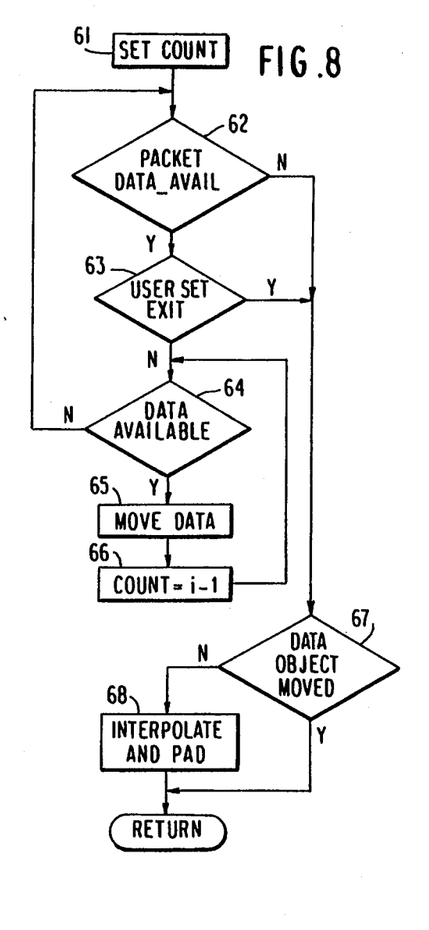
FIG. 8 is a flow chart showing the microcode for the data move entry points including correction for data skew.

Upon entry to the microcode shown in FIG. 8, a loop count is set in function block 61. The value of this count varies with the entry point called. Next, the state of the Packet and Data Available signals is checked in decision block 62. This point is also used when the Data Available signal drops during the transfer to check the Packet signal and see if the transfer is complete. In decision block 63, a user exit indication is checked. This allows an abort request by the user to be checked, and if active, the data move loop is exited. The user exit is only checked if the Data Available signal has gone away but the Packet signal is still active. Decision block 64 is the top of the normal data movement loop. The data available indicator is checked again. If it is active, control passes to function block 65 which moves two words of data from the interface to the destination buffer, and the loop count is decremented in function block 66. If it is not active, control passes to the top of the entry point for the purpose of checking the state of the Packet signal. If the Packet signal is inactive, the transfer is over and control passes to decision block 67, the error checking point. If the Packet signal is active, but the Data Available signal is not, execution loops from decision blocks 62 to 64 until either data available becomes active or the user abort is set. If the Data Available signal becomes active while looping, the data move loop (decision block 64 to function block 66) is entered. If the user abort is taken, control passes to decision block 67, the error checking point. At decision block 67, the data count is checked to see if the expected data count was received. If it was not, because of a user abort or data loss, control passes to function block 68. Here, the data buffer is padded by replicating the last word in the buffer by the amount of the residual count. This has the effect of completing the image, if the data was an image data object, and of ensuring that the data pointers are set for the next transfer to start on the correct boundary. This solves the problem of data loss and subsequent skew which might otherwise be observed. At this point, if the Packet signal has dropped, as it should have, the hardware state machine disables the Ready signal function. Control now passes back to the application running on the personal computer or workstation. Some of the entry points re-enable the Ready signal at this point.

Figure 9:
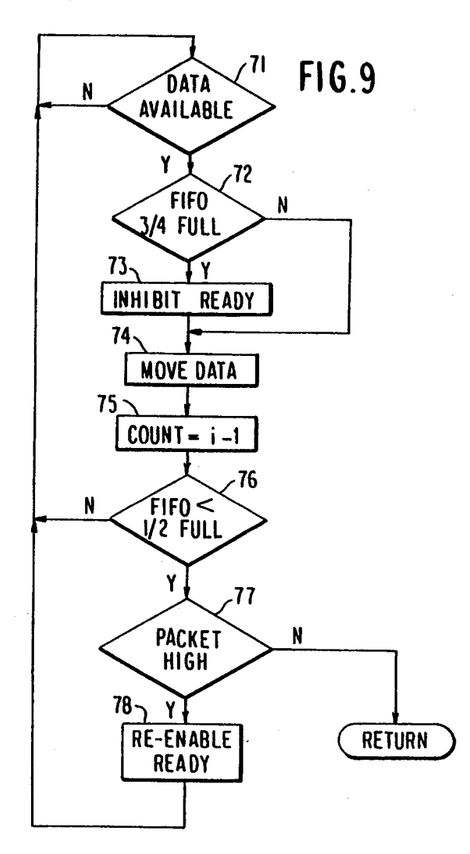
FIG. 9 is a flow chart showing the microcode used to pace the data transfer operation.

Pacing of the host data transfer is accomplished by the hardware state machine by disabling the receive interface by not sending Ready signals when the buffer is full. This occurs often in the implemented system because the PS/2 computer cannot move data as fast as the FIFO buffer can store it. This is due in part to code latency but is due mainly to the limited bus bandwidth of the MICRO CHANNEL bus. With reference now to FIG. 9, the microcode first checks to determine if data is available in decision block 71 and then to determine if the FIFO buffer is three quarters full. If the FIFO buffer is three quarters full, the Ready signal is inhibited in function block 73. Data is moved from the FIFO buffer in function block 74 and the count is decremented in function block 75. Then the FIFO buffer is again checked in decision block 76 to determine if it is less than half full. If it is, the Packet signal is checked in decision block 77 to determine if it is still present, and if it is, the reply signals are re-enabled in function block 78. This will cause the hardware state machine to start sending Ready signals, and the data transfer will resume until the FIFO buffer is again full. This is especially crucial when moving data to the IBM 8514 display memory.

Figure 10:
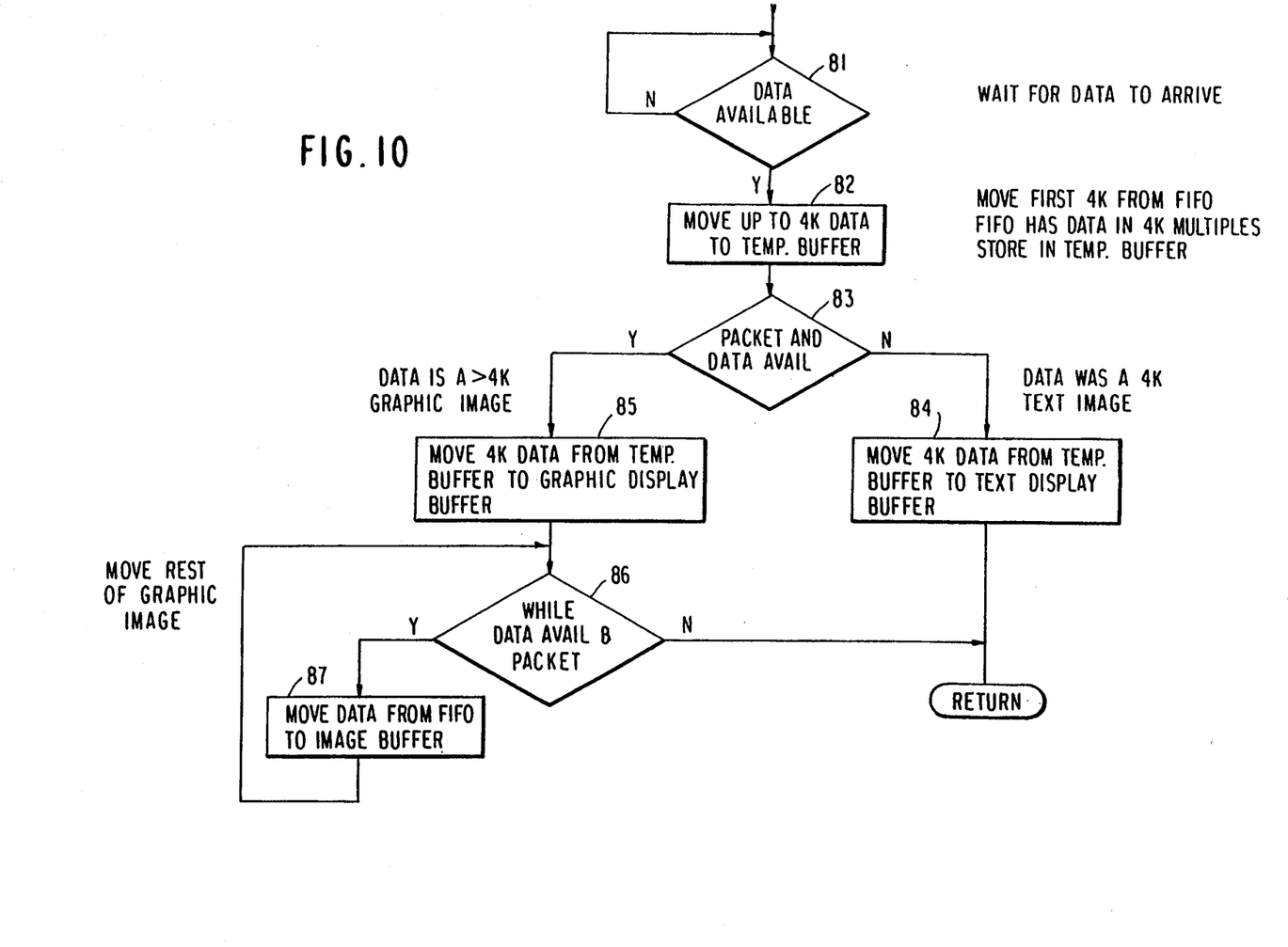
FIG. 10 is a flow chart showing the microcode for detecting and routing different data object types.

In a system with two destinations for data of different sizes, i.e., graphics and text, the Packet signal is used to route the data. This is shown by the microcode illustrated in FIG. 10. The text data may be, for example, 4 K bytes in length, and the graphics data significantly larger. When data arrives in the FIFO buffer, as detected in decision block 81, 4 K of data is moved from the FIFO buffer to a temporary buffer in function block 82. When data arrives from the host, the FIFO buffer will always have at least 4 K of data available. After the first 4 K has been moved, the Packet and Data Available signals are checked in decision block 83. If both signals are inactive, then the transfer was a 4 K data transfer, meaning it is destined for the text image buffer. The 4 K data in the temporary buffer is moved into the text image display buffer in function block 84. If either signal is still active, then the transfer is for greater than 4 K data; i.e., it is a graphic image. The 4 K data in the temporary buffer is moved to the graphic image buffer in function block 85. The rest of the data is moved, as it comes from the host, from the FIFO buffer to the graphic image display buffer in blocks 86 and 87. Thus, by keeping track of the transfer count and checking it when the Packet signal drops, the type of data can be determined and appropriately routed. This solves the problem of not having address support and of removing latency required to route data by using the Packet information itself.

The invention supports attachment of any MICRO CHANNEL based computer to the ANSI HIPPI channel at a burst data rate of 100 MB per second and at sustained rates equal to the maximum that the MICRO CHANNEL bus can support. The adapter provides a simple, effective means of synchronizing the transmission of data objects between the 3090 and the MICRO CHANNEL bus which is modest in cost and easy to implement. This is made possible by using a single FIFO buffer instead of a large, costly RAM (random access memory) buffer. In addition, the invention makes unique use of the Packet signal on the HIPPI to signal the boundaries of data objects transferred to the personal computer or workstation.

Figure 11:
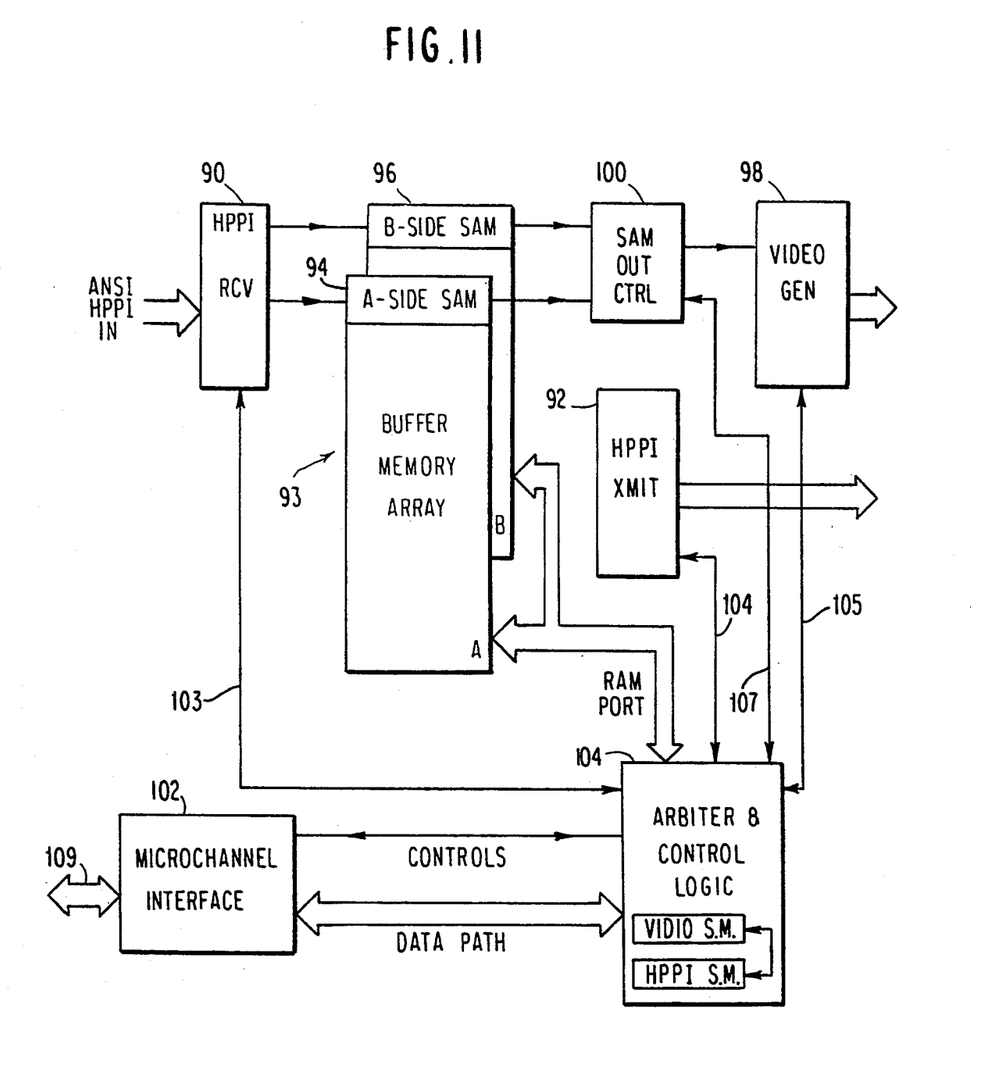
FIG. 11 is a block diagram showing the components of a host to adapter interface according to another aspect of the invention.

Referring now to FIG. 11, there is shown a HIPPI adapter according to another aspect of the present invention. The HIPPI channel receiver 90 receives the signals from the high speed channel and converts them from differential ECL signals to the TTL signals needed by the rest of the adapter. In addition to signal conversion, this logic also checks the parity and error checking codes of the incoming data and controls the activation of the Ready signals to the HIPPI source. Operation of this receiver 90 is controlled by a receive state machine which is part of the receiver. The HIPPI transmitter 92 transmits data and control information via the outbound HIPPI interface. It converts internal signal levels to the differential ECL levels used on the interface and controls transmission via the Burst and Ready signals on the outbound interface. Like the receiver 90, the transmitter 92 is controlled by its own state machine. The buffer 93 memory is composed of two identical arrays 94 and 96, denoted the A and B buffers, respectively. The buffer memory serves as temporary data storage for transmission and as video refresh storage for receiving. The buffer memory 93 also serves to match the speeds of the HIPPI channel and the video display device.

Because of the large mismatch in channel speeds, it is necessary to provide the storage buffer to accept data from the HIPPI channel at the full rate the HIPPI transmits. Thus, the buffer 93 must be able to accept data at 100 MB per second. The size of this buffer is application dependent, but is should be large enough to hold the smallest data object that can be sent by the HIPPI. In the case of one implementation of the invention, the buffer size was 1.28 MB since that is the size of one video image. For inconvenience, the size of the buffer is rounded up to the nearest value that matches the RAM modules selected to implement the buffer.

As shown in FIG. 11, there are two identical storage arrays, called the A and B buffers. The two arrays are managed using the well known "ping-pong" technique wherein one buffer is loaded as the other is read out and then switched so that the array that was just read out is next loaded while the array that was just loaded is read out. The memory arrays themselves are comprised of two port RAM modules. Each arrays has a random access (RAM) port and a serial access (SAM) port. The SAM port consists of a shift register that is loaded in parallel from the main array. Data is then shifted out of the SAM port until the register is emptied. The size of the SAM shift register is such that a requirement to access the main array is greatly reduced. While the exact size depends on the particular RAM modules chosen, sizes of 512 bits or more are available. This means that only one access to the main array is needed for each 512 pixels of display data. With the reduced contention for the main array, there is time left to use the second port (the RAM port) for other purposes. In the case of this invention, the RAM port is connected to the MICRO CHANNEL interface 102 allowing the workstation to access the A and B buffers 94 and 96 as part of its internally addressed memory. Useful functions that the workstation can perform include saving and restoring images to disk, annotating images, and so forth. Since there is no other connection to the RAM port, the workstation has access to both the A and B buffers at all times.

The video generator 98 controls the display of the data in the buffers 94 and 96 via an attached CRT or similar display (not shown). The video generator 98 therefore generates control signals, including blanking and synchronization signals, for the display unit, converts the digital video information into analog signals using a digital-to-analog converter (DAC), and controls and manages the color look-up tables for the DAC. These functions are conventional in a video generator.

The arbiter and control logic 104 contains the video state machine and the HIPPI transmit/receive state machine. The state machines are driven by microcode that follow the flow charts of FIGS. 12 and 13. The video state machine in logic 104 is coupled to the HIPPI transmit/receive state machine, to Serial Out Controls 100 via leads 107 and video generator via leads 105. The HIPPI transmit/receive state machine is coupled to HIPPI receiver via leads 103, to HIPPI transmitter via leads 106 and to Serial Out Controls 100 via leads 107.

The SAM Out Controls 100 manages the connection between the output of the serial access memory (SAM) 94, 96 and the video generator 98 or the HIPPI output via the transmitter 92. The SAM Out Controls 100 grants the video display generator 98 the highest priority to ensure that the video display is never disrupted. The SAM Out Controls 100 therefore ensure that the video component is always attached to either the A or B SAM ports.

The MICRO CHANNEL logic 102 interprets the signals on the MCA bus 109 and permits the workstation to access the buffer and control circuits of the adapter. The functions performed by the MICRO CHANNEL logic 102 include MICRO CHANNEL POS (power on sequence) functions, mapping of the buffer memory and access to status information. More specifically, the IBM MCA defines an initialization process for setting up the logic in all MICRO CHANNEL adapters. In the case at hand, these functions include setting the interrupt level that the adapter will use, MICRO CHANNEL I/O addresses the adapter will use, and memory addresses the adapter will use.

The POS logic also needs to decode specific POS addresses and commands. The logic circuits also map the buffer into an area of system memory that can be accessed by workstation software. The exact address of the area is variable so that the memory map can be customized for different configurations via the POS process. In addition, the logic also presents status information to the workstation in response to read commands from the MICRO CHANNEL bus. This function permits workstation software to determine the status of the HIPPI link and the buffer memory.

The arbiter and control logic 104 interlocks the operation of all of the other components and manages the connection of the buffer memory ports among them. The functions performed include controlling the refresh operation of the dynamic RAMs in the A and B buffers 94 and 96, supplying the addresses for the RAM and SAM transfers for both HIPPI send and receive operations, passing the addresses from the MICRO CHANNEL bus to the RAM port on the buffers when there are no conflicting operations, sending the proper control signals to the SAM out controls to select the SAM connections for the video and HIPPI transmission, supplying the proper signals to the video generator 98 for the loading and timing parameters and look-up tables from the MICRO CHANNEL bus, controlling the switching of the A and B buffers 94 and 96 when they are filled via the HIPPI receiver 90, and controlling the frame rate of the video generator 98.

In operation, the transfer of data from the HIPPI channel to the adapter shown in FIG. 11 is accomplished as follows. The first event is the initialization of the HIPPI by the source. One key parameter that is set at this time is the size of a packet. The packet size is set to correspond to the size of the data object being set. In the case of one implementation, objects being sent were images containing 1024 K bytes. By adjusting the size of the packet, other image frame sizes can be accommodated.

As soon as the channel is initialized, the source asserts the Request signal on the HIPPI channel. The adapter responds with the Connect signal indicating that data transfer may begin. After the receipt of the Connect signal, the source asserts the Packet signal and waits for a Ready signal from the adapter. The HIPPI transmit/receive state machine in logic 104 sends a signal to the arbiter indicating the need for an inbound SAM connection. The arbiter 104 selects whichever buffer 94 or 96 is available, i.e., not connected to the video generator 98, and returns a signal called "Buffer Available" to the transmit/receive state machine identifying the buffer to be used. The receive state machine then asserts the Ready signal.

In response to the Ready signal, the source transmits one burst along with making the burst line active. The adapter logic is designed to keep sending Ready signals until the Packet signal goes false. If more data is transmitted than the buffer can hold, the buffer address wraps around and overwrites the beginning of the buffer. In an implementation of the invention, the buffer is large enough to accommodate the largest image that can be displayed, so this situation is unlikely to occur. When the Packet signal goes low, the receive state machine signals the arbiter 104 that the buffer has been filled. The arbiter 104 then waits for the video generator 98 to signal that the display device has reached a vertical retrace interval. Since the display is blanked at this time, the arbiter 104 can change the connection via the SAM out controls 100 to display a new image. When the buffer swap occurs, the old buffer (last image displayed) is made available to the HIPPI receiver 90 so that the next image can be transmitted from the source. This process may repeat indefinitely with the receiver 90 and video generator 98 alternating between the A and B buffers 94 and 96 to show a series of pictures.

Since the HIPPI can operate at a 100 MB rate, it is possible to send pictures to the buffers at a rate that is greater than the frame rate of the display device. Consider a display device that has a 1 K×1 K frame size. If there is one byte per pixel, each frame comprises a megabyte of data. The channel can therefore send 100 frames per second. The usual frame rate for CRT displays is 60 frames per second. It is therefore possible to send as many a 40 frames per second more than the display can show. This problem is solved by using a counter to count the number of times a frame has been shown on the screen. Control logic then ensures that a buffer swap does not occur until a frame has actually been displayed at least once. The counter is set by workstation software using the MICRO CHANNEL interface. By using different values in the counter, precise control over the frame rate of the display can be achieved. This function is especially useful when the display is being used to show animated sequences since variations in the frame rate will distract the viewer.

The HIPPI receive and transmit operations are quite similar. They are also mutually exclusive since performing both concurrently would block video generator access to both buffers causing the display to be blanked. The HIPPI transmit operation is set up via the MICRO CHANNEL port by workstation software. All of the necessary control settings are performed via the MICRO CHANNEL port. The setup information includes which buffer 94 or 96 is to be used as the information source, the number of bytes to be transferred, the value of the I-field to be transmitted, and the Packet size. Unlike the receive operation, it is important to select which buffer is to be used. Controls in the transmit state machine set the SAM out controls 100 to a particular buffer. The workstation software determines which buffer is being displayed by the video generator 98, locks the video generator to that buffer temporarily, and sets the unused buffer for use by the transmit state machine. In addition to buffer selection, workstation software must initialize registers that determine transmitted packet size, manage the correct number of transfers for each burst and set the I-field value.

Once buffer selection and setup are accomplished, the transmit/receiver state machine is activated. It asserts the Request signal on the transmit interface and waits for a Connect signal. Once the Connect signal is received, bursts will be transmitted in accordance with the HIPPI protocol until the counters are exhausted. Each burst is followed by LRC (longitudinal redundancy check) information. When the transmission completes, the workstation software releases the video generator's lock on the currently displayed buffer, and normal functions are restored.

The video generator 98 has several options that enable it to match a wide range of requirements. For example, it can match a wide variety of display devices from 512×512 to 1280×1024 pixels, it can show still frames or animations, and it permits viewing of three-dimensional images by switching between two slightly different images.

The MICRO CHANNEL functions necessary to support the operation of the video, receive and transmit functions include address decoding, video generator configuration, mode control, interrupt generation and handling, data transmission and reception, and status reporting. The HIPPI video adapter control registers and data buffers are accessed through this interface as if it were internal memory. This assures fast data access and manipulation. Registers are set by the workstation software to set up the video timings, enable/disable sync, set sync characteristics, set color look up tables values, and the like. Access to a control register is provided through the mode control mechanism to allow the workstation software to control which buffer is displayed, which buffer is used for data transfer to the host, to enable reception of data from the host, and to turn on the three-dimensional image mode. Interrupts may be enabled and disabled through the MICRO CHANNEL logic 102. The interrupt will occur when a packet has been received. Packet size on receive operations is set by the host application. Thus, the system may be tuned to interrupt when a full image has been received. This is useful for detecting error conditions and controlling the buffer display swapping. Data in the buffer memory may be accessed (read and/or written) by the workstation software. Data may be written to a buffer and set to the host by filling in a count register and setting the I-field register. Data may be sent from the host and accessed by the workstation. Status information is available through this interface that indicates the status of a data transfer operation, data errors on receive operations and interface errors on transmit operations. Successful transmission status is also indicated.

The video adapter provides a high speed path using the ANSI HIPPI interface for transmission of video information to a display device which is part of a MICRO CHANNEL workstation. It operates at a speed of 100 MB per second by implementing a direct connection from the HIPPI interface to the display memory, thereby providing the fastest possible update of the display screen. It automatically switches frames for animation and provides for the viewing of three-dimensional images.

Figure 12:
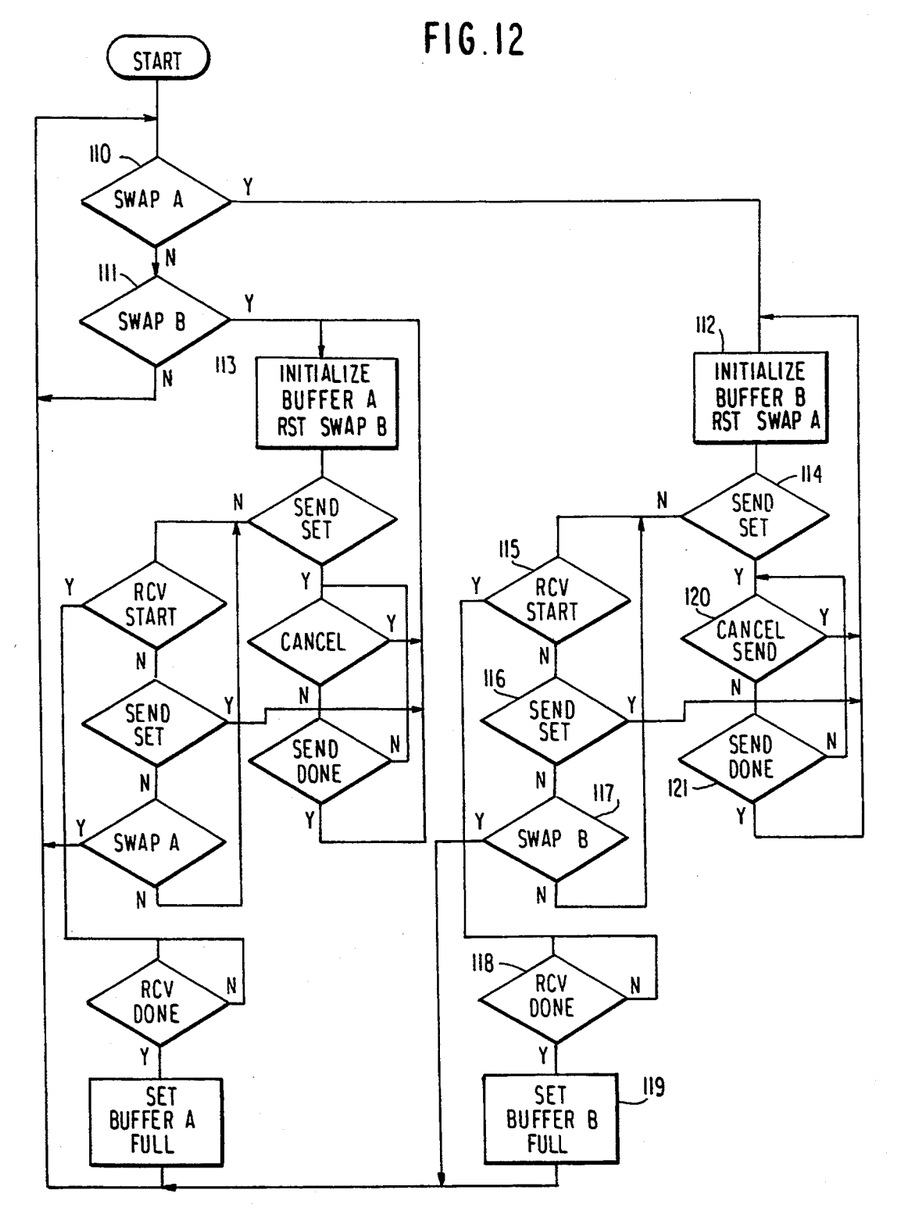
FIG. 12 is a flow chart showing the microcode of the HIPPI state machine for buffer management in the adapter shown in FIG. 11.
Figure 13:
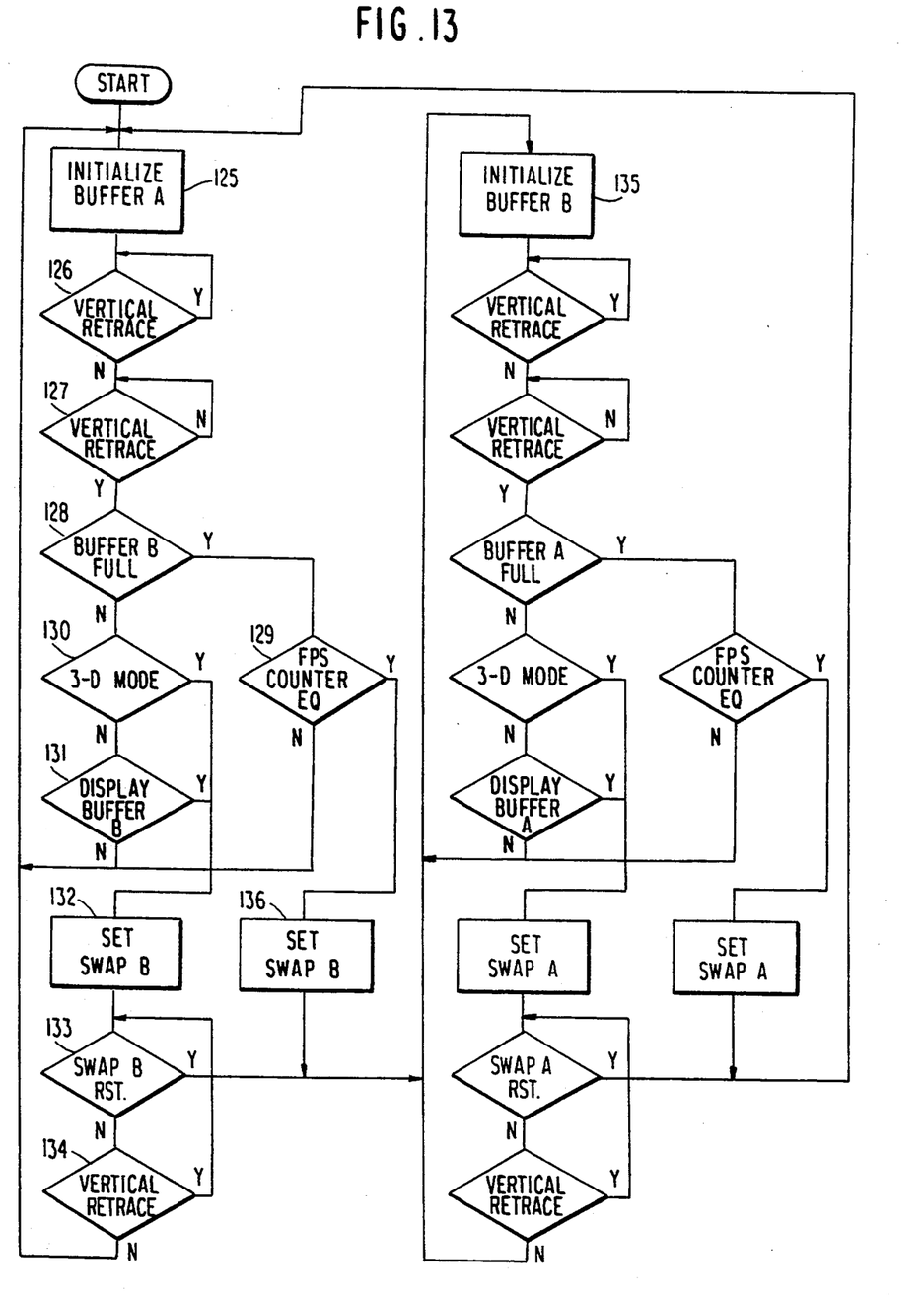
FIG. 13 is a flow chart showing the microcode of the video state machine for buffer management in the adapter shown in FIG. 11.

FIG. 12 shows the logic of the microcode of the HIPPI transmit/receive state machine for buffer management of the adapter illustrated in FIG. 11, while FIG. 13 shows the logic of the microcode of the video state machine for buffer management of the adapter shown in FIG. 11. As described above, the video state machine has priority over the HIPPI state machine to prevent blanking or interference of the display. Therefore, the HIPPI state machine may be considered a "slave" of the video state machine.

Referring to FIG. 12 first, the process of the HIPPI state machine monitors flags set by the video state machine indicating when buffers A and B should be swapped, as indicated by the decision block 110 and 111. If the flag to swap buffer A is set, then buffer B is initialized and the flag to swap buffer A is reset in function block 112. Similarly, if the flag to swap buffer B is set, then buffer A is initialized and the flag to swap buffer B is reset in function block 113.

Assume that the swap buffer A flag was set and buffer B has been initialized as indicated in function block 112. A test is then made in decision block 114 to determine if data is to be transmitted. This is indicated by a flag set by the workstation software. For the purposes of the present description, assume that data is being received (i.e., the send flag is not set), so control goes to decision block 115 where a test is made to determine if it is time to start receiving data. This is determined by the protocol previously described. If it is not time to start receiving data, a test is made in decision block 117 to determine if the transmit status has changed. If so control loops back to function block 112; otherwise, a further test is made in decision block 117 to determine if buffer B should be swapped as indicated by the flag being set by the video state machine. If the swap buffer B flag has been set, control loops back to decision block 110. Assuming the swap buffer B flag has not been set, control loops back to decision block 115. When a receive start is detected, a data packet is received from the HIPPI channel. At the end of a data packet, the end of a data reception is detected in decision block 118. At this point, the buffer B FULL flag is set, and control loops back to decision block 110. The buffer B FULL flag is read by the video state machine in the process illustrated in FIG. 13.

Assuming that data is to be transmitted on the HIPPI channel, the buffer not connected to the video generator is selected. If buffer B is selected for the transmit operation, that condition is detected in decision block 114. A further test is made in decision block 121 to determine if the transmit operation has been canceled by the operator. If so, control loops back to function block 112; otherwise, the transmit operation proceeds. A test in decision block 121 detects when the transmit operation has completed. At this point control loops back to function block 112. Now, when the test is made in decision block 114, control branches to decision block 115. The flag for swapping buffer B is detected in decision block 117, and control then loops back to decision block 110.

The processes just described for buffer B are replicated for buffer A. These are illustrated in FIG. 12 but are not further described.

FIG. 13 shows the process of the video state machine for buffer management. By convention, at power up, the process begins by initializing buffer A, as indicated by function block 125. In other words, video state machine arbitrarily always starts by selecting buffer A. A test is made in decision block 126 to determine a vertical retrace is in progress. If so, the process waits for the end of the vertical retrace and, then in decision block 127, the process waits for the beginning of the net vertical retrace. This is to assure that the buffer management functions are completed during the vertical retrace time so as not to adversely affect the display. The buffer B FULL flag is checked in decision block 128. It will be recalled that this flag is set by the HIPPI state machine at function block 119 in FIG. 12. If the buffer B FULL flag is set, the frames per second (FPS) counter is checked in decision block 129 to determine if the count is equal to a preset count. This is a user defined option, allowing the user to control the rate of display of successive frames. If the FPS counter is not equal to the preset count, then control loops back to function block 125. Assuming that the buffer B FULL flag has not been set, then a check is made in decision block 130 to determine if the three-dimensional mode has been selected. If not, a check is net made in decision block 131 to determine if the display buffer B flag has been set. If not, control loops back to function block 125.

Assuming that either the three-dimensional mode has been selected or that the display buffer B flag has been set, the set swap B buffer flag is set in function block 132. It will be recalled that it is this flag that is checked in decision block 111 in FIG. 12. As check is then made in decision block 133 to determine if the swap B flag has been reset. This is done in function block 113 in FIG. 12. If not, a test is next made in decision block 134 to determine if a vertical retrace is in progress. If so, control loops back to decision block 133; otherwise, control loops back to function block 125. If the swap B flag has been reset in decision block 133 control goes to function block 135 where buffer B is initialized. Similarly, if the FPS counter is equal to the preset count in function block 125, the set swap buffer B flag is set in function block 136, and control goes to function block 135.

The control for buffer B is similar to that just described and, while illustrated in FIG. 13, it is not described further.

Figure 14:
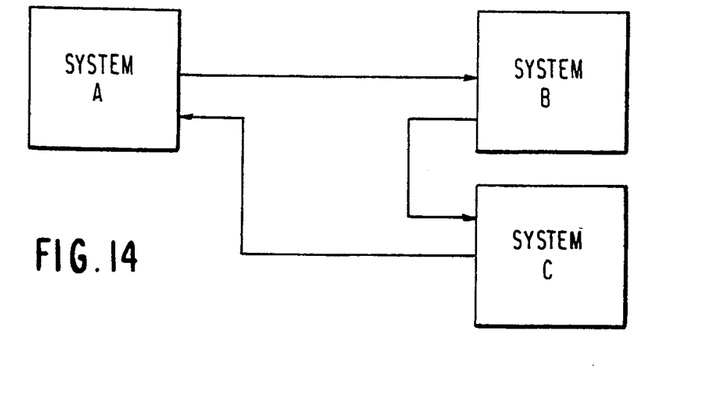
FIG. 14 is a block diagram illustrating a "Daisy chain" configuration of three systems according to another aspect of the invention.

According to another aspect of this invention, the basic HIPPI adapter shown in FIG. 2 is modified to support a "Daisy chain" connection of systems, as illustrated in FIG. 13, thereby avoiding the requirement for a switch device as illustrated in FIG. 4. FIG. 14 shows the strategy for permitting multiple devices to attach to a HIPPI channel. These may be multiple workstations or video displays connected to a single or multiple hosts. Thus, while the blocks in FIG. 14 are labeled as "System A", "System B" and "System C", these are to be interpreted as host, workstation or video display. Although there is no "master/slave" relationship between the systems, it is easier to understand the operation of the configuration shown in FIG. 14 if it is assumed that System A is the "master" (e.g., host) and Systems B and C are attached workstations.

When System A asserts a Request signal, it places an I-field on the data lines in the HIPPI channel. This number is preset by software in System A to identify one of the attached Systems B or C. The I-field signal will propagate to the first device in the chain, System B in this case, where it is examined. If System B recognizes the I-field it will then return the Connect signal and commence normal channel operation. If System B does not recognize the I-field, it will then retransmit all of the information (data and control) it receives on the inbound side via its outbound side. The I-field will then pass on to System C where the process repeats. If neither system recognizes the I-field, then System C will propagate the I-field back to the inbound side of System A. In most cases, System A will not have set the I-field to its own address, so it will then detect a timeout error when there is no response to the Request signal. System A could use its own address in the I-field in order to check the integrity of the chain. Note also that System A can perform a wrap test by transferring data from its outbound to its inbound interface by looping the chain in this fashion.

Figure 15:
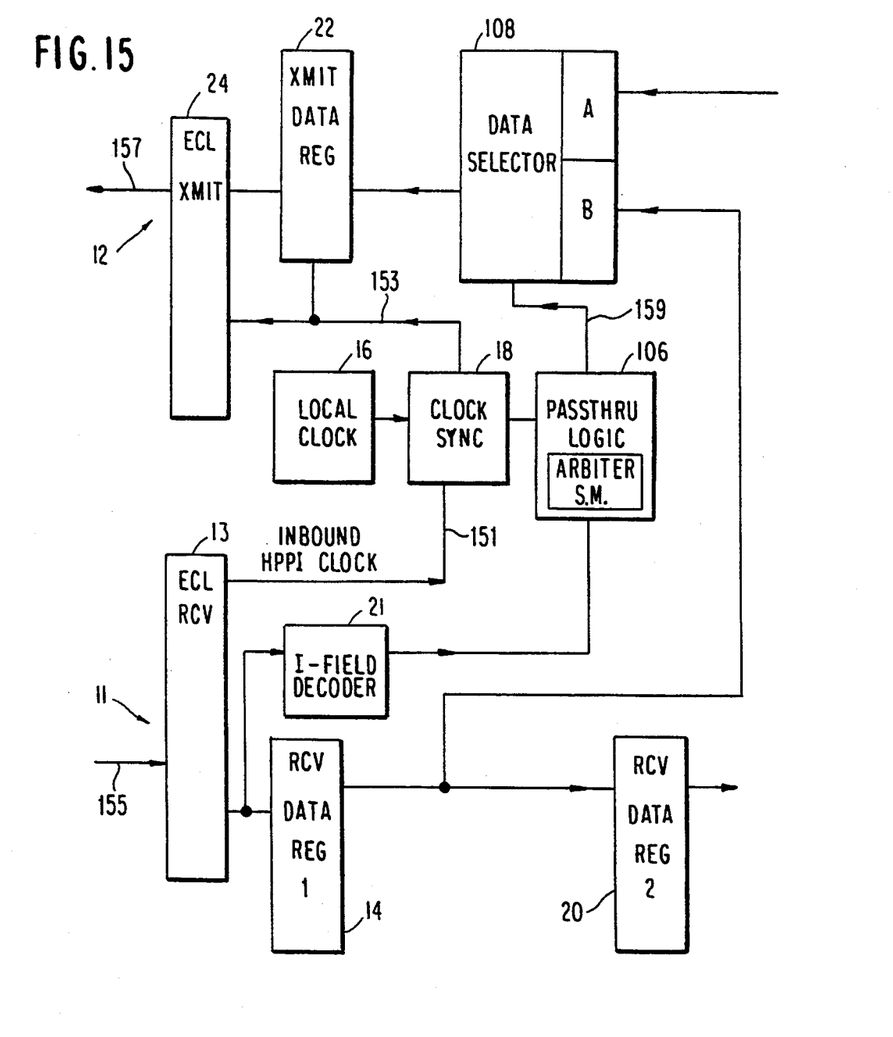
FIG. 15 is a block diagram of the HIPPI adapter with a pass through function to support the "Daisy chain" configuration illustrated in FIG. 14.

The additions to the HIPPI adapter to accomplish the pass through function, and thus permit the Daisy chain connection of the devices, is shown in FIG. 15. Like reference numerals in FIGS. 2 and 15 denote identical components. The basic operation of this function is similar to that of logic used for a "wrap test". There are some key differences, however, that are important to the proper operation of the pass through function. These differences concern the propagation of the clock from the inbound side.

When an inbound Request signal is received, the I-field is decoded in decoder 21 against a predefined value or set of values. The result is passed to arbitration logic comprising an arbiter state machine in the pass through logic 106 and the clock synchronization logic 18. Based on the predefined values, the inbound Request, and all further transactions, will either be accepted by the HIPPI adapter for processing or passed through to the outbound side 11 to be retransmitted to the next device in the chain.

The information in the I-field may be interpreted in a number of different ways. For example, it may be interpreted to accept a particular 32-bit value and pass all others, accept a range of values and pass all others, pass a particular value and accept all others, pass a range of values and accept all others, make accept/pass decisions on a subset of the 32 bits, and so forth.

Once the decision to pass through is made, the outbound HIPPI adapter clock must be synchronized with the inbound HIPPI clock so that the data passed will be in step with the clock. The approach taken is to pass on the inbound clock from the original source rather than to receive and synchronize the inbound data to the local clock 16 and then retransmit it using the local clock. This technique minimizes the pass through delay while keeping the synchronization function to a minimum. Clock synchronization is accomplished in the following manner.

The clock synchronization circuitry 18 sends the lock HIPPI adapter clock to the outbound HIPPI interface unless a pass through is indicated. When pass through is required, the arbiter state machine in logic 106 waits for the local clock 16 to be in its logical "1" or active state, switches the inbound clock lead 151 to the outbound clock lead 153 via a selector gate in the clock synchronization circuits 18 and unfreezes the outbound clock signal. The outbound clock will then follow the inbound clock. The arbiter state machine in the pass through logic 106 also switches the inbound data and control signals on leads 155 to the outbound leads 157 via selector 108, register 22 and ECL transmit 24. This is controlled at the data selector 108 by control signal from pass through logic 106 on lead 159. The clock synchronization circuits 18 ensures that the skew between the outbound data and control signals and the outbound clock is within that required by the ANSI standard. When pass through is no longer indicated, i.e., the Request signal goes low, the procedure is reversed to place the local clock back on the outbound interface. The adapter is then ready to repeat the entire decision process when the Request signal is again asserted on the inbound interface.

The modification to the HIPPI interface thus provides a means of connecting more than one device to the ANSI HIPPI channel without a switch. This approach is inexpensive, making it attractive to connect, for example, multiple workstations to a host using the HIPPI channel. Moreover, it has but a small effect on the data rate. This effect is limited to a total extra delay of 120 ns. or less, per packet.

Figure 16:
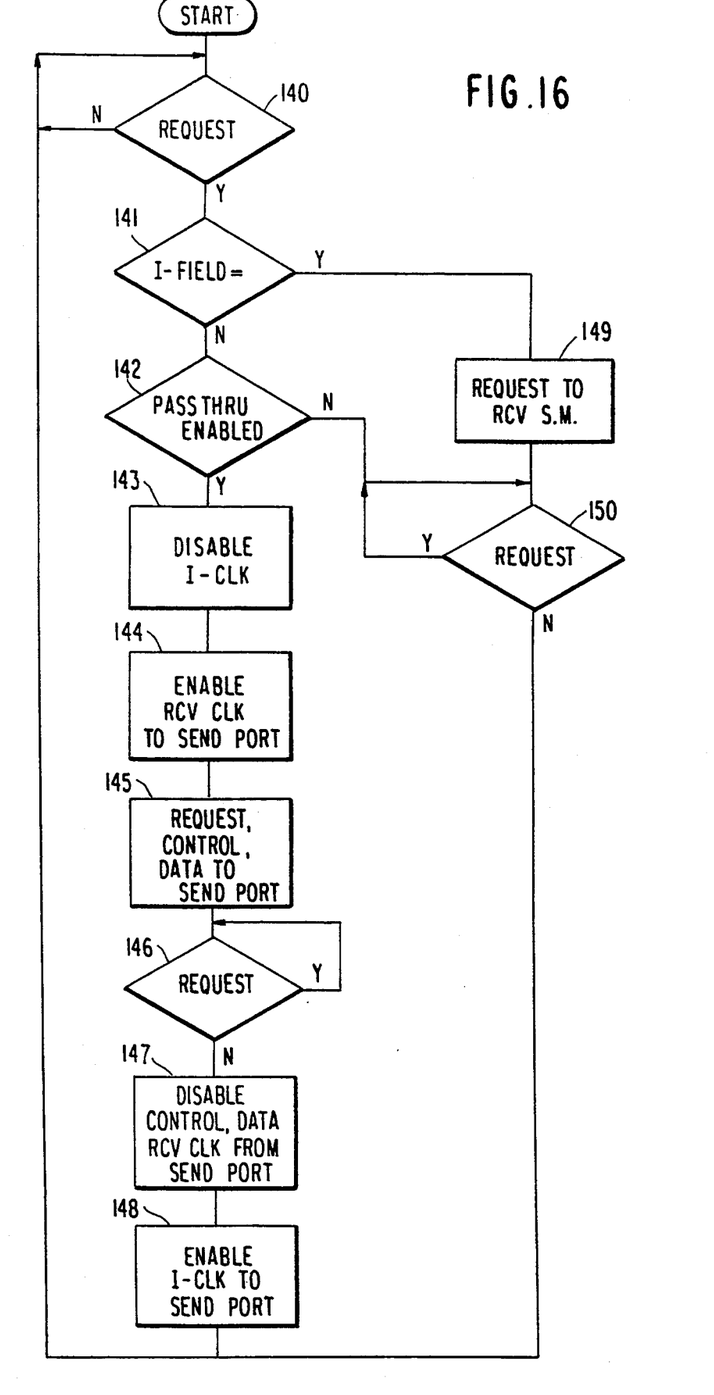
FIG. 16 is a flow chart showing the microcode of the request and pass through arbiter in the adapter shown in FIG. 15.

FIG. 16 shows the logic of the microcode for the request and pass through arbiter of the adapter shown in FIG. 15. The process begins by checking for a request in decision block 140. When a request is detected, the I-field is compared with the system I-field in decision block 141 and, assuming that the I-fields are different, a further check is made in decision block 142 to determine if the pass through function is enabled. This contemplates the possibility that the user may disable this function for purposes of maintenance or other reasons. Assuming that the pass through function is enabled, then the internal clock is disabled in function block 143. The receive clock is enabled in function block 144 to synchronize the data with the received clock. Next, in function block 145, the request, control and data are sent to the transmit port. The request signal is monitored in decision block 146, and when it goes low, the control and data receive clock are inhibited to the transmit port in function block 147. The internal clock is again enabled to the transmit port in function block 148 before control loops back to decision block 140.

Returning now to decision block 141, if the received I-field and the local I-field compare, then a request is sent to the receive state machine in function block 149. The request signal is then monitored in decision block 150, and when it goes low, control loops back to decision block 140.

While the invention has been described in terms of a single preferred embodiment, those skilled in the art will recognize that the invention can be practiced with modification within the spirit and scope of the appended claims. Specifically, other host computers implementing the ANSI standard high speed parallel interface can be interconnected with other personal computers and workstations using the principles taught by this invention.

Having thus described out invention, what we claim as new and desire to secure by Letters Patent is as follows:

1. An adapter for use in transferring data, in high speed bursts or packets of data words, between a host computer and a personal computer or workstation bus at a high performance parallel interface where, during the receipt of a ready signal from the adapter, the host computer provides the bursts of data words to the adapter along with a packet signal which remains active during the transfer, said adapter comprising:
   first in-first out buffer means with status signal means for storing said data words in said buffer means and providing a plurality of status signals from said status signal means, each such status signal for indicating a different level of data stored in said buffer means relative to the buffer means full storage capacity;
   interrupt means responsive to said status signal means for providing an interrupt signal to the attached personal computer or workstation when a data available status signal from the status signal means indicates there is data in said buffer means said interrupt signal granting priority to emptying the buffer means over other functions performed by the personal computer or workstation;
   transfer means responsive to the interrupt signal to transfer data words from said buffer means onto said bus to empty said buffer means on such a priority basis;
   reading signal means for providing a ready signal to the host computer to indicate that the adapter is available to receive data into said buffer means when a status signal from the status signal means indicates data in the buffer is less than a first intermediate level and not providing said ready signal to the host when a status signal from the status signal means indicates the data in the buffer is greater than a second larger intermediate level; and
   monitoring means for monitoring both said packet signal and said data available status signal from said status signal means to see if both indicate the data transfer is complete.

2. The adapter of claim 1 wherein said interrupt means includes means for preventing further interrupts while said ready signal is up.

3. The adapter of claim 2 wherein said host computer and said adapter have different clock speeds.

4. The adapter of claim 3 wherein said adapter includes:
   latching means responsive to the host clock signal for capturing the data; and
   data synchronizing means for synchronizing the incoming data to the adapter clock.

5. The adapter of claim 2 including means for returning control of the bus to applications running on said workstation or personal computer and dropping said ready signal when both said data available status packet signal indications indicate data transfer is complete.

6. The adapter of claim 5 including means for continually rechecking said packet signal when said data available status signal indicates no data is available, continuing said rechecking until said packet signal indicates that the data transfer is complete or said data available status signal indicates data is available.

7. The adapter of claim 6 including terminating means for ending said continuous rechecking and returning control of said bus to applications running of said workstation or personal computer and dropping said ready signal even though said packet signal does not indicate the data transfer is complete.

8. The adapter of claim 1 including routing means for routing text data image packets of one size and graphic image packets of a larger size to different buffers comprising:
   means measuring the size of the data transfer and checking the packet signal and the data available sign when said one size is reached;
   transfer means for moving data into one of said different buffers if both the data available status and packet signals indicate the data transfer is complete and for moving data into the other of said buffers when either of said packet or data available signals indicates said transfer is not complete.

9. The adapter of claim 8 including:
   counter means for checking the amount of data actually received in said other of said two buffers when indicia from both said data available status and packet signals indicates said transfer is complete; and
   duplication means for duplicating data actually received to complete an image packet when said check indicates not all expected data was received.

10. An adapter for transferring data in high speed bursts or packets to a personal computer or workstation bus or to a video generator means for a display, said packets provided from a host computer at a high speed parallel interface where, during the presence of ready signals provided by said adapter, the host computer provides the bursts of data and a packet signal which remains active for the length of the transfer, said adapter comprising:
   a pair of buffer arrays connected so that data may be read into one buffer array while data is being read out of the other, each buffer array having a main array portion with a parallel port coupled to said bus and a serial port coupled to said video generator means, said serial port comprising a shift register portion that is loaded in parallel from the main array portion and shifted out serially;

serial output control means coupled to the serial ports of both said buffer arrays to select between them for transfer of data alternately from one or the other of said serial ports to said video generator in a ping pong fashion for presentation on said display; and interface control means for controlling access to said buffer arrays by said bus and said high speed parallel interface granting highest priority to emptying the buffer array currently transferring data whereby either one of said buffer arrays can interface said high speed parallel interface or the personal computer or workstation bus to receive data, including data to be provided to said video generator means, while the other one of said buffer arrays provides data through its serial port to said video generator means.

11. The adapter of claim 10 including output buffer means coupled to said parallel ports of said buffer arrays and said high speed parallel interface of the host computer for transferring data from the bus of the personal computer or workstation to the host computer through said high speed parallel interface.

12. The adapter of claim 11 including arbiter and control logic means for controlling the interfacing of said buffer memory arrays by said high speed parallel interface of the host computer, said output buffer and said bus to provide highest priority to either the high speed parallel interface or to the workstation or personal computer when it is providing data for said video generator to maintain a video display without interruption.

13. The adapter of claim 12 wherein said arbiter and control logic means includes switch means for controlling the serial output control means to switch between the buffers only during a vertical retrace in said data.

14. The adapter of claim 13 wherein said host computer provides data on said high speed parallel interface at a different speed than the display rate of the display.

15. The adapter of claim 14 including counter means for assuring that swapping between said buffers does not occur without displaying each frame of information at least once.

* * * * *